United States Patent
Jokinen

(10) Patent No.: US 6,532,254 B1
(45) Date of Patent: Mar. 11, 2003

(54) RECEIVER AND RECEIVING METHOD SIMPLIFYING THE INTERFERENCE CANCELLATION OF MULTI-USER DETECTION IN A DIRECT SEQUENCE CODE DIVISION MULTIPLE ACCESS (DS-CDMA) TELECOMMUNICATION SYSTEM

(75) Inventor: Sami Jokinen, Oulu (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/269,979

(22) PCT Filed: Oct. 17, 1997

(86) PCT No.: PCT/FI97/00634
§ 371 (c)(1),
(2), (4) Date: May 28, 1999

(87) PCT Pub. No.: WO98/18210
PCT Pub. Date: Apr. 30, 1998

(30) Foreign Application Priority Data
Oct. 18, 1996 (FI) .................................................. 964206

(51) Int. Cl.⁷ .............................. H04B 1/713; H04B 1/10
(52) U.S. Cl. ...................... 375/148; 375/349; 375/348
(58) Field of Search ................................. 375/141, 142, 375/147, 148, 144, 150, 346, 348, 349; 370/320, 335, 342; 455/63

(56) References Cited

U.S. PATENT DOCUMENTS

| 4,349,916 A | * | 9/1982 | Roeder | 375/349 |
| 4,613,978 A | * | 9/1986 | Kurth et al. | 375/346 |
| 5,377,225 A | * | 12/1994 | Davis | 375/144 |
| 5,671,247 A | * | 9/1997 | Souissi et al. | 375/144 |
| 6,014,412 A | * | 1/2000 | Wiese et al. | 375/346 |
| 6,023,488 A | * | 2/2000 | White | 375/145 |

FOREIGN PATENT DOCUMENTS

| EP | 641102 | 3/1995 | H04K/1/02 |
| EP | 717505 | 1/1997 | H04B/1/707 |

OTHER PUBLICATIONS

Takawira, "Adaptive Lattice Filters for Narrowband Interference Rejection in DS Spread Spectrum Systems", Proceedings of the 1994 IEEE South African Symposium on Communications and Signal Processing, COMSIG–94, Feb. 1994, pp. 1–5.*

Rusch et al., "Multiuser Detection Techniques for Narrowband Interference Suppression in Spread Spectrum Communications", IEEE Transactions on Communications, vol.: 43 Issue 2 Part: 3, Feb./Mar./Apr. 1995, pp. 1725–1737.*

Poor et al., "Adaptive Suppression of Narrowband Digital Interferers from Spread Spectrum Signals", IEEE International Conference on Acoustics, Speech, and Signal Processing, ICASSP–96, vol: 2, Mar. 1996, pp. 1061–1064.*

(List continued on next page.)

*Primary Examiner*—William Trost
*Assistant Examiner*—Rafael Perez-Gutierrez
(74) *Attorney, Agent, or Firm*—Pillsbury Winthrop LLP

(57) ABSTRACT

The invention relates to a receiving method and a receiver. In the method, in order to remove interference of a received composite signal, narrowband interfering signal estimates corresponding to the interfering signals are subtracted from a narrowband composite signal. The narrowband interfering signal estimates are generated in the interference cancellation primitives of the receiver by multiplying a detected bit of the interfering signal by a cross correlation and a channel estimate of spreading codes.

19 Claims, 6 Drawing Sheets

OTHER PUBLICATIONS

Lim et al., "Adaptive Narrowband Interference Cancellation in Overlaid CDMA Systems Using Prior Knowledge", 7th IEEE International Symposium on Personal, Indoor, and Mobile Radio Communications, PIMRC '96, vol: 3, May 1996, pp. 838–842.*

Bjerke et al., "A Hypothesis–Test Technique for Narrowband Interference Suppression in Spread Spectrum Systems", Communications: The Key to Global Prosperity, Global Telecommunications Conference, GLOBECOM '96, vol: 3, May 1996, pp. 1463–1467.*

Proceedings of the IEEE, vol. 76, No. 6, Jun. 1988, Milstein, I.B.: "Interference Rejection Techniques in Spread Spectrum Communications" p. 657–p. 671.

IEEE Transactions on Communications, vol. 30, No. 5, May 1982, Ketchum, J.W. et al: "Adaptive Algorithms for Estimating and Suppressing Narrow–Band Interference in PN Spread–Spectrum Systems" p. 913–p. 924.

Fawer et al, "A Multiuser Receiver for Code Division Multiple Access Communications over Multipath Channels", IEEE Transactions on Communications, vol. 43, No. 2/3/4, Feb./Mar./Apr. 1995.

* cited by examiner

RECEIVER AND RECEIVING METHOD SIMPLIFYING THE INTERFERENCE CANCELLATION OF MULTI-USER DETECTION IN A DIRECT SEQUENCE CODE DIVISION MULTIPLE ACCESS (DS-CDMA) TELECOMMUNICATION SYSTEM

This application is the national phase of international application PCT/FI97/00634 filed Oct. 17, 1997 which designated the U.S.

FIELD OF THE INVENTION

The invention relates to a receiving method used in a CDMA radio system comprising, as a transmitter and a receiver, at least one subscriber terminal and a base station, which receive composite signal that has been multiplied by a spreading code into wideband, the composite signal arriving at the receiver over several paths from a plurality of transmitters, the composite signal then representing both interfering signals and desired signals and which composite signal is converted into narrowband in the receiver and detected.

The invention further relates to a receiver arranged to be used in a CDMA radio system comprising at least one subscriber terminal and a base station which are arranged to receive wideband composite signal comprising signals propagated over several paths from a plurality of transmitters, and which composite signal comprises both interfering signals and desired signals and which composite signal the receiver is arranged to convert into a narrowband signal and to detect.

BACKGROUND OF THE INVENTION

In a DS-CDMA (Direct Sequence Code Division Multiple Access) the user's narrowband data signal is modulated by a spreading code, which is more wideband than the data signal, to a relatively wide band. In systems used, bandwidths from 1.25 MHz to 50 MHz have been employed. A spreading code is conventionally formed of a long pseudo-random bit sequence. The bit rate of the spreading code is much higher than that of the data signal and in order to distinguish spreading code bits from data bits and symbols, they are called chips. Each user data symbol is multiplied by the spreading code chips. Then the narrowband data signal spreads to the frequency band used by the spreading code. Each user has his/her own spreading code. Several users transmit simultaneously on the same frequency band and the data signals are distinguished from one another in the receivers on the basis of a pseudo-random spreading code. However, the signals of different users interfere with each other in the receiver as the spreading codes are not entirely orthogonal particularly on account of a phase shift caused by a propagation delay.

Multiple access interference of the CDMA systems are reduced, for example, by using Multi-User Detection (MUD). There are several such methods and using them interference from the users cell area can best be reduced, and thus improve the capacity of the system. Known MUD solutions are based on two main types: regeneration of a wideband signal after preliminary detection or decorrelation in which a reverse matrix of a cross correlation matrix of the spreading codes is generated. In the former, interference is removed to the effect that the strongest regenerated signals are subtracted from the received wideband composite signal. Regenerating the wideband signal, however, requires a lot of calculation capacity from the receiver. In the latter, interference is reduced by multiplying a received signal vector by the reverse matrix of the cross correlation matrix of the spreading codes, the generation of which becomes more difficult as the number of users and paths increases.

SUMMARY OF THE INVENTION

An object of the present invention is to implement a solution in which it is avoided to generate a wideband signal and to reverse a cross correlation matrix of spreading codes and thus simplifying the interference cancellation of multi-user detection.

This is achieved with the method of the type set forth in the preamble characterized by subtracting a narrowband interfering signal estimate of one path of at least one transmitter from a narrowband composite signal propagated over several paths in the receiver in order to generate an interference cancelled signal.

A receiver of the invention is characterized by comprising an interference cancellation means comprising a plurality of interference cancellation primitives which are arranged to generate at least one narrowband interfering estimate signal describing interference, the interference cancellation means being arranged to subtract a narrowband interfering estimate signal from the narrowband composite signal.

Great advantages are achieved with the method of the invention. Multi-user detection and interference cancellation can be performed using simple operations without regenerating a wideband signal or reversing a cross correlation matrix. In addition, the reduction of the mutual interference of the signals simplifies power control and reduces transmission power. This, in turn, reduces interference and allows a larger capacity of the system.

BRIEF DESCRIPTION OF THE DRAWINGS

In the following the invention will be described in greater detail with reference to examples in the accompanying drawings, in which.

DETAILED DESCRIPTION OF THE PREFERRED EMBODIMENTS

Figure 1:
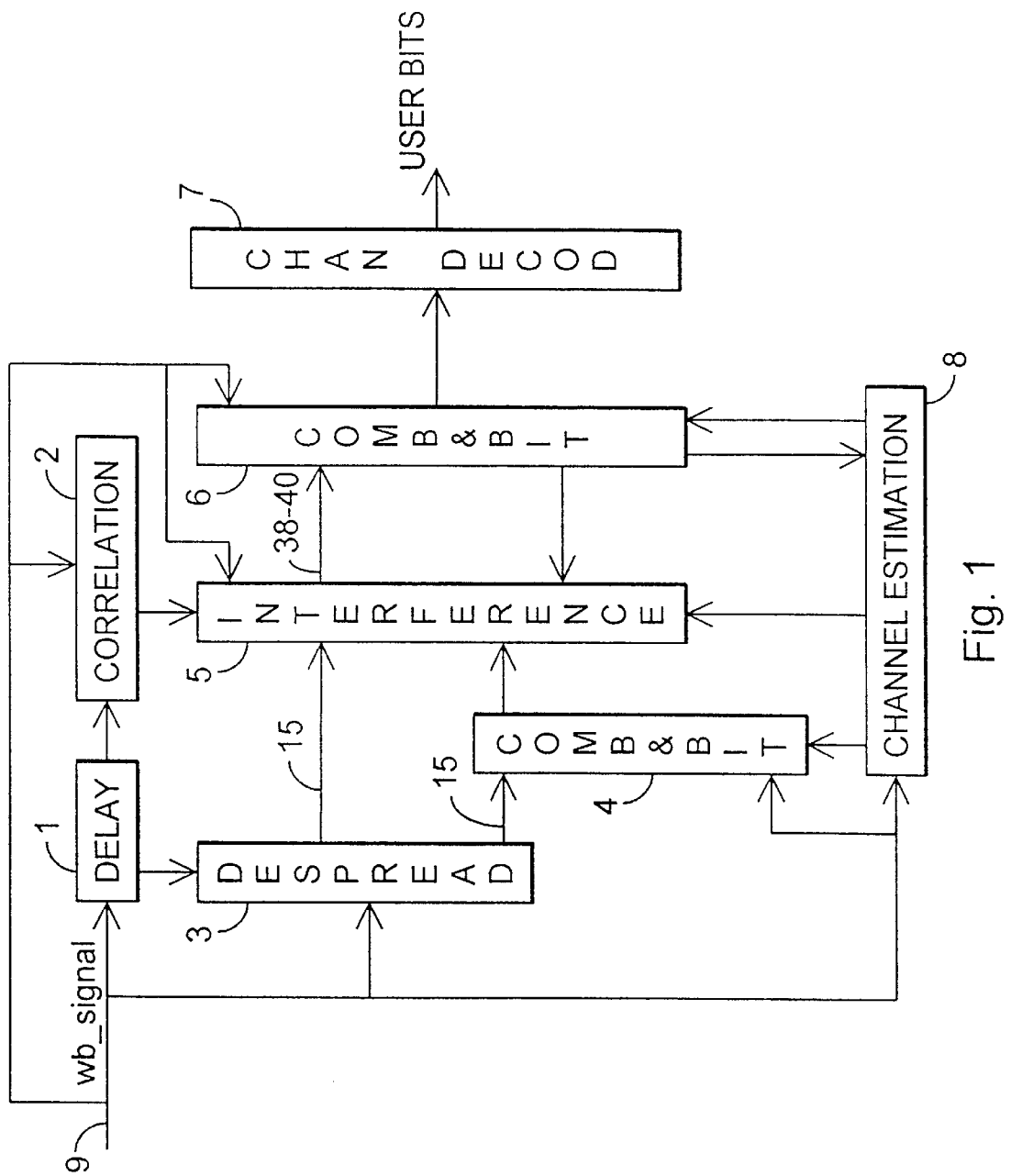
FIG. 1 is a block diagram illustrating a receiver.

The solution of the invention can be used particularly in a CDMA system using direct spreading without restricting thereto. A received composite signal comprises signals of a plurality of users propagated over several paths, the signals having phase deviations regarding each other due to different propagation time. The signal of one path is made interference-free by removing the effects of the signals of other paths. When the signals of all paths have thus been cleaned free from interference, the signals of the paths can be combined user-specifically and strong interference-free desired signals can be obtained.

Let us now examine in more detail the theoretical basis of the solution of the invention. A received asynchronous CDMA signal r (t) is generally in mode $$r(t) = s(t, B) + n(t), \quad (1)$$

where $$s(t) = \sum_{k=1}^{K(t)} \sum_{i=-P}^{P(k)} \sum_{l=1}^{L(t,k)} h_{k,l} \sqrt{\frac{E_b}{T_b}} b_{k,i} a_{k,l}(t - \tau_{k,l} - iT_b), \quad (2)$$

where $s_k(t)$ is a multi-path propagated multi-user signal, n(t) is noise, $a_{k,l}$ is a user-specific spreading code wave form, B is a matrix of user bits $b_{k,i} \in \{-1, +1\}$, $\tau_{k,l}$ is delay caused by asynchrony, $h_{k,l}$ comprises information on attenuation, $E_b$ is bit energy and $T_b$ is a bit time slot. Instead of a bit, $b_{k,i}$ can represent a combination of bits, or a symbol. The number of users K (t) is a function changing with time, P (k) is the number of bits to be transmitted and L (t, k) is the number of received signal components depending on time and the user, i.e., L (t, k) corresponds to the paths on which the signals have propagated. L (t, k) changes as a function of time since the number of multi-path propagated signal components of different users changes with time. Each signal can be considered as long as a spreading code period at a time.

In order to perform the interference cancellation of the invention information is needed on the cross correlation between the spreading codes of different signals. Here the cross correlation of the spreading codes means also covariance or another corresponding operation measuring similarity or dissimilarity. The cross correlation is calculated, for example, as follows:

$$R_{l,l',i}(k, k') = \int_{-\infty}^{+\infty} a_k(t - \tau_{k,l}) a_{k'} \cdot (t + iT_b - \tau_{k',l'}) dt,$$

where $R_{l,l',i}$ (k, k') determines the correlation between user k and user k' in relation to these subscribers' paths l and l', in which k is a desired user and k' is a user causing interference and l is a desired path and l' is an interference path. As the signals are limited in time and the propagation delays are determined, whichever cross correlations $R_{l,l',i-i'}$ (k, k') obtain the value 0, when |i-i'|>2. This simplifies both correlation and interference cancellation, as the forming of them over the interference bit indexes i' can be limited in the range, [i-2, i+2] comprising five bits. The multi-user receiver is described in greater detail in the publication : U. Fawer, B. Aazhang, A Multiuser Receiver for Code Division Multiple Access Communications over Multipath Channels, IEEE Transactions on Communications, vol. 43 (2,3,4), Feb/Mar/Apr 1995, which is incorporated herein by reference.

Let us examine the interference cancellation method of the invention in more detail. In this solution the composite signal is preliminary detected in such a manner that the bit decisions of different paths of different users are made. The preliminary bit decisions are made, for example, in a RAKE branch or in a matched filter. The signal interference cancellation of one path is performed in such a manner that the effects of other paths are reduced from the signal, and only a cleaned signal of one path remains. This operation is performed for a signal of all paths in a serial mode or in parallel, whereby the signals of all paths being processed are cleaned from interference.

In the solution of the invention the interfering signal is subtracted from the composite signal when both signals are of narrowband. This means that the spreading coding of the composite signal is decoded, but the signal is, however, preferably modulated by Binary Phase Shift Keying (BPSK) or Quadrature Phase Shift Keying (QPSK). The symbols of the desired signal and the interfering signal arrive at the receiver probably as phase shifted, whereby more than one symbol of the interfering signal interferes with a symbol of one desired signal. Then the effect of the symbols of the interfering signal, by their interfering parts, is subtracted from one symbol of the desired signal.

Let us now examine the solution of the invention in greater detail with reference to FIGS. 1–9. FIG. 1 shows one possible block diagram of the receiver. The receiver comprises a delay estimation means 1, a correlation means 2, a despreading means 3, a first combining bit decision means 4, an interference cancellation means 5, a second combining and hard-decision means 6, a channel decoder 7 and a channel estimation means 8. The delay estimation means 1 generates from a wideband composite signal 9 a propagation delay for the signals of different paths of different users. The correlation means 2 calculates auto and cross correlations for the spreading codes of different users utilizing the delay information of the delay estimation means 1. In the despreading means 3 the wideband spreading coding of the composite signal is decoded and path-specific narrowband signals 15 are generated, which signals are demodulated in accordance with prior art and combined into user-specific bit decisions in the first combining and bit decision means 4. In the interference cancellation means 5 interference is removed path-specifically in accordance with the method of the invention, after which the signals from which interference is removed are combined as transmitter, i.e., user-specific signals 38–40 and are demodulated as preliminary bit decisions in the second combining and bit decision means 6. The cleaned bits of a particular user can be re-fed into the interference cancellation means 5 for a new interference cancellation. The channel coding of interference cancelled bits is decoded in the channel decoder 7, the output of which the bits of each user are. A complex channel estimate needed in interference cancellation is formed in the channel estimation means 8. Each of the blocks 1–8 is also provided with a sufficient amount of memory.

Figure 2:
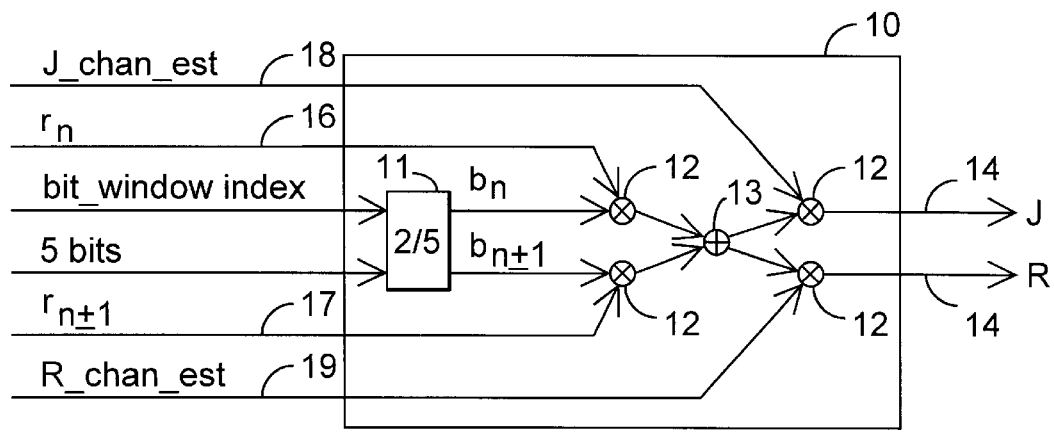
FIG. 2 shows an interference cancellation primitive.
Figure 5:
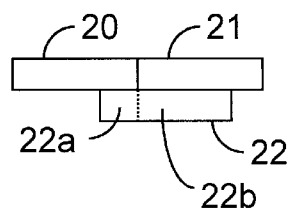
FIG. 5 shows a phase deviation of an interfering signal and a desired signal.

FIG. 2 shows an interference cancellation primitive 10 by which the interference cancellation means 5 is implemented particularly when the BPSK modulation is used. The interference cancellation primitive 10 comprises a selection means 11 by which two consecutive bits $b_n$ and $b_{n\pm1}$ from the five bit window of the interfering signal are chosen by a bit index window bit_window_index. The window comprises five bits as the cross correlations $R_{l,l',i-i'}$ (k, k') obtain the value 0 when |i-i'|>2. These two bits are typically in such a phase that they interfere with one bit of the desired signal, as illustrated in FIG. 5. Both of the selected bits are multiplied in order to form a weighted estimation result in a multiplier 12 by a cross correlation 16 and 17 between the spreading codes of a desired signal and an interfering signal, the cross correlation functioning as a weight value in such a manner that the cross correlation is the greater the more the interfering signal interferes with the desired signal. The cross correlations corresponding to both bits $b_n$ and $b_{n\pm1}$ are $r_n$ and $r_{n\pm1}$ 16 and 17. The interference magnitudes are summed in a summer 13 whereby a total interference magnitude is formed. The total interference size is multiplied in the multiplier 12 by a complex channel estimate R_chan_est and J_chan_est 18 and 19. Then a complex interfering estimate signal 14 is generated comprising a real interfering estimate signal R and an imaginary interfering estimate signal I.

Figure 3:
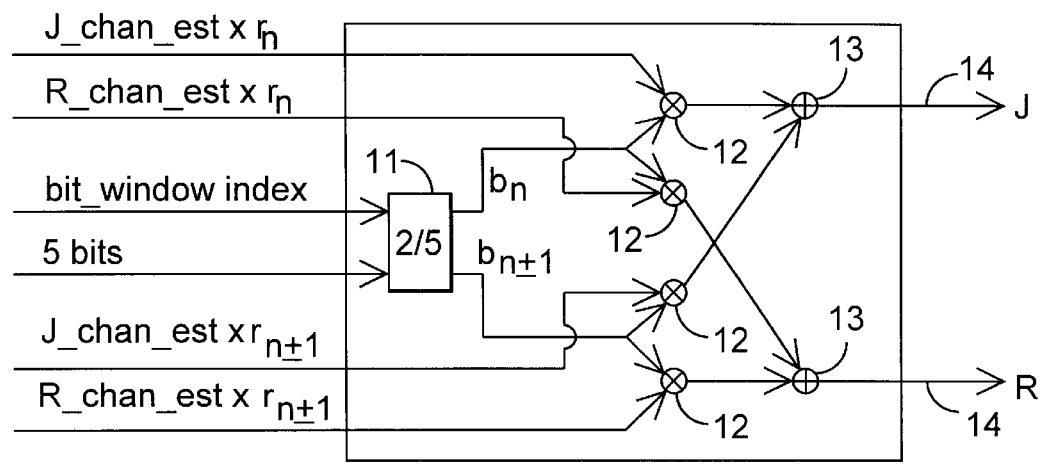
FIG. 3 shows an interference cancellation primitive.

It is assumed in the solution in FIG. 3 that a complex channel estimate R_chan_est and J_chan_est 18 and 19 remains stable during several bits. Then the channel estimate R_chan_est and J_chan_est 18 and 19 and the cross correlation $r_{n\pm1}$ and $r_n$ 16 and 17 of the desired signal and the interfering signal also remaining stable during several bits, can preliminary be multiplied as R_chan_est*$r_n$, R_chan_est*$r_{n\pm1}$, J_chan_est*$r_n$ and J_chan_est*$r_{n\pm1}$ and store the results in memory. Then both consecutive interfering bits are multiplied by the product of the channel estimate and the cross correlation in a complex way and a complex interfering estimate signal is generated by summing the interference effects of both bits. At this time the multipliers 12 are preferably inverters as multiplication by a bit is performed by changing the character of the multiplicand, when the bit is mapped into the group [−1,+1].

Figure 4:
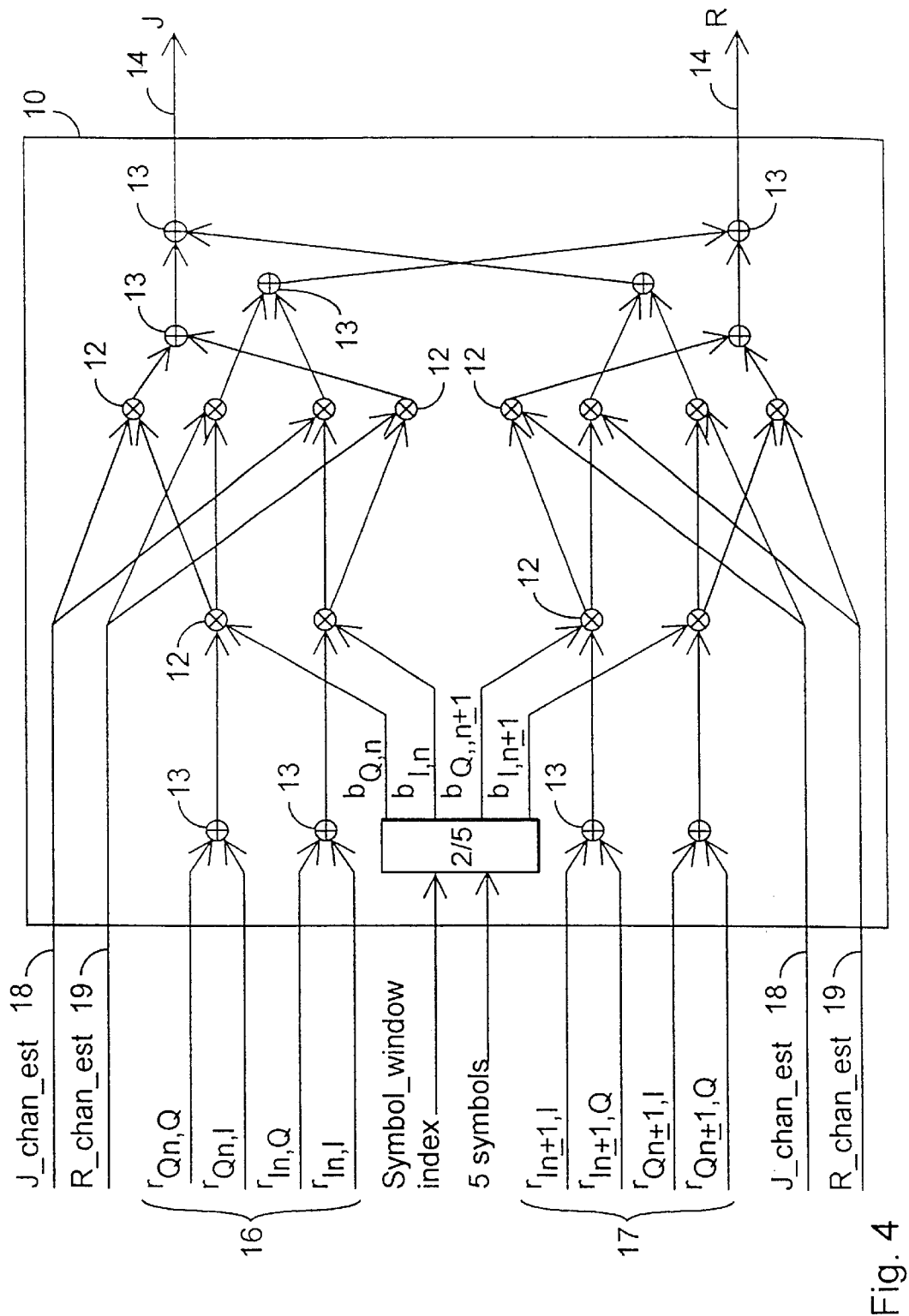
FIG. 4 shows an interference cancellation primitive.

FIG. 4 shows the solution of the invention when the QPSK modulation is used. Then the interference cancellation primitive comprises a selection means 11 to select two symbols from a five symbol window using a symbol window index symbol_window_index. After this the bits included in the symbols are preferably dealt with in the same way as in the case of the BPSK modulation. Eight cross correlation values $r_{Qn,\,Q}$, $r_{Qn,\,I}$, $r_{In,\,Q}$, $r_{In,\,I}$, $r_{Qn\pm1,\,Q}$, $r_{Qn\pm1,\,I}$, $r_{In\pm1,\,Q}$ and $r_{In\pm1,\,I}$, 16 and 17 are thus needed as one QPSK symbol comprises two bits, of which a Q and an I cross correlation result is needed for both bits, and where the I and Q symbols stand for the I/Q symbols of the QPSK modulation. In other words, one symbol of the desired signal is correlated with two interfering signal symbols, as in the case of the BPSK modulation, but both bits of the desired signal are correlated with four interfering signal bits. Cross correlation $r_{Qn,\,Q}$ stands for the cross correlation n of the Q symbol of the interfering signal with the Q symbol of the desired signal, $r_{Qn,\,I}$ stands for the cross correlation n of the Q symbol of the interfering signal with the I symbol of the desired signal, $r_{In,\,Q}$ stands for the cross correlation n of the I symbol of the interfering signal with the Q symbol of the desired signal, $r_{In,\,I}$ stands for the cross correlation n of the I symbol of the interfering signal with the I symbol of the desired signal, $r_{In\pm1,\,I}$ stands for the cross correlation n±1 of the I symbol of the interfering signal with the I symbol of the desired signal, $r_{Qn\pm1,\,q}$ stands for the cross correlation n±1 of the Q symbol of the interfering signal with the Q symbol of the desired signal, $r_{Qn\pm1,\,I}$ stands for the cross correlation n±1 of the signal Q of the interfering symbol with the I symbol of the desired signal, $r_{In\pm1,\,Q}$ stands for the cross correlation n±l1 of the I symbol of the interfering signal with the Q symbol of the desired signal and $r_{In\pm1,\,I}$ stands for the cross correlation n±1 of the I symbol of the interfering signal with the I symbol of the desired signal. The channel estimate is complex comprising an imaginary part J_chan_est 18 and a real part R_chan_est 19. This solution can also be simplified in the same way as in the case of the BPSK modulation in FIG. 3, when the channel estimate is slowly changing in comparison with the duration of the symbols.

FIG. 5 shows a simplified situation on how the interfering signal symbols interfere with the desired signal symbol. The symbol is a bit or a combination of bits. The interfering signal comprises consecutive symbols ($b_n$ and $b_{n+1}$) 20 and 21. The desired signal comprises a symbol 22 which is divided into parts 22a and 22b as they appear in the phase shift with the interfering signal symbols 20 and 21. The figure shows that in interfering cancellation the symbols 20 and 21 of two interfering signals are to be preferably removed from the desired signal symbol 22, and 22a and 22b in so far as they interfere with the desired signal symbol 22.

Figure 6:
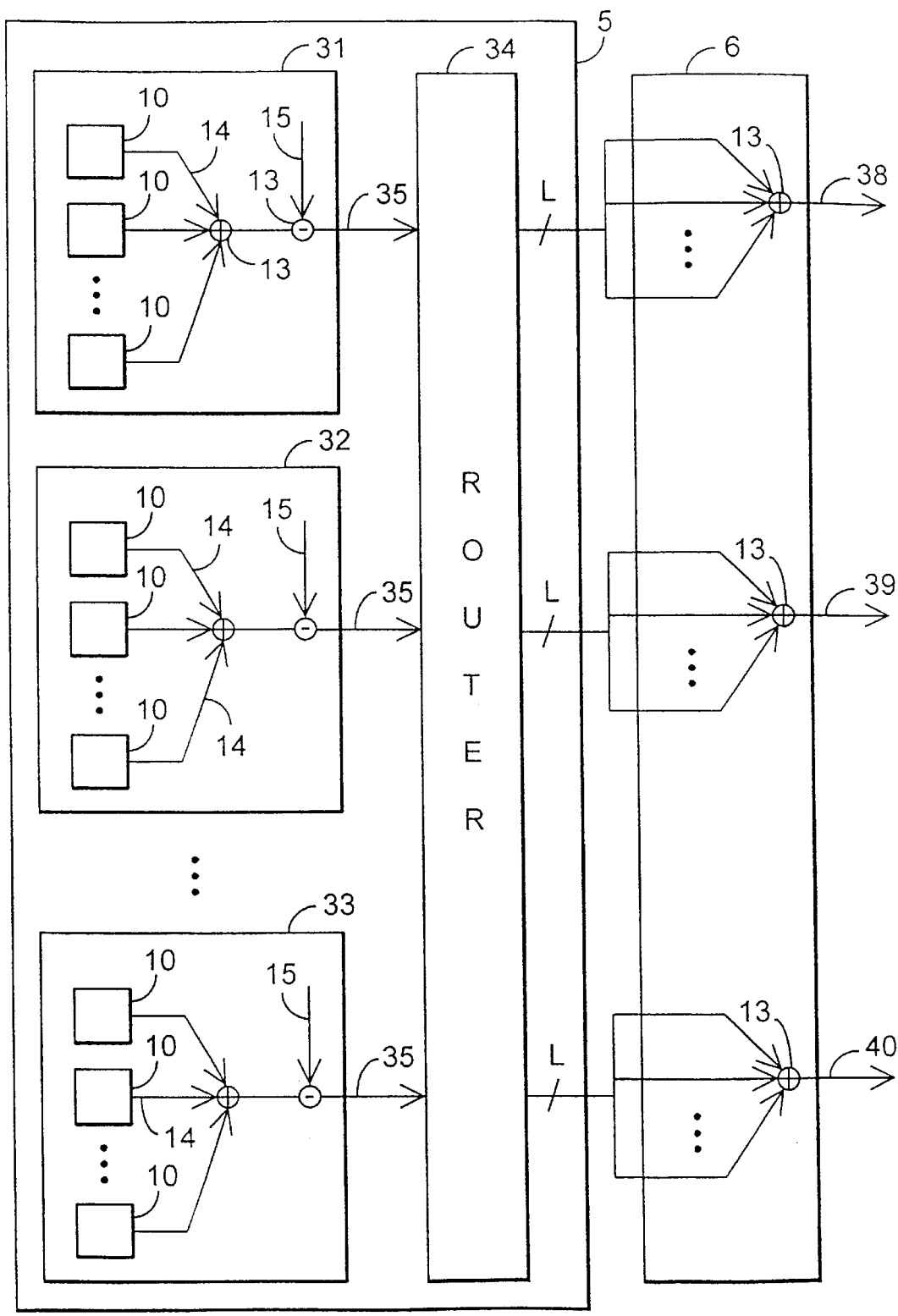
FIG. 6 shows an adaptive interference cancellation.

FIG. 6 shows a preferred embodiment of the invention. In this figure the real part (and the imaginary part I of the QPSK modulation are not shown separately but the signals are to be assumed to be complex. The interference cancellation means 5 of the solution comprises a set of interference cancellation units 31–33 comprising interference cancellation primitives 10. In addition, the receiver of the invention comprises a routing means 34 and a combining means 6. The combining means 6 comprises a set of user-specific path combining means 13. In this adaptive solution there is preferably a predetermined number of interference cancellation units 31–33 and interference cancellation primitives 10. Each interference cancellation primitive 10 generates an interfering signal estimate and each interference cancellation unit 31–33 generates, in turn, a cleaned signal 35 of one path I. Interference cancellation can preferably be performed more than once, when new interfering signal estimates are generated using interference cleaned signals and said new interfering signal estimates 14 are removed from a narrowband signal 15. Then after the first interference cancellation, bit decisions that are more reliable than the bit decisions originally made, are made from the received signal. Using these more precise bit decisions a better channel estimate can, in turn, be formed and together with cross correlation a better interfering estimate signal can be generated. When the interfering estimate signals thus generated are reduced from the received total increasingly cleaner user signals are obtained. A multiple interference cancellation is preferably performed three times at the most. The routing means 34 directs the interference cleaned signal 35 of each path adaptively to the user-specific combining means 6, in which paths L of each subscriber k are combined into one signal 38–40. This solution comprises preferably K*L interference cancellation units, in which K indicates the number of users and L is the average number of paths of each user. This solution works also with a smaller number of interference cancellation units, whereby example an L interference cancellation unit 31–33 is needed. A control unit of the receiver preferably directs a new interfering path to a free interference cancellation unit 31–33. Similarly the interference cancellation unit 31–33 is released when the interfering signal weakens. In this solution different users can have a varying number of paths, as the signals of the different paths can adaptively be directed to a free interference cancellation unit.

Figure 7:
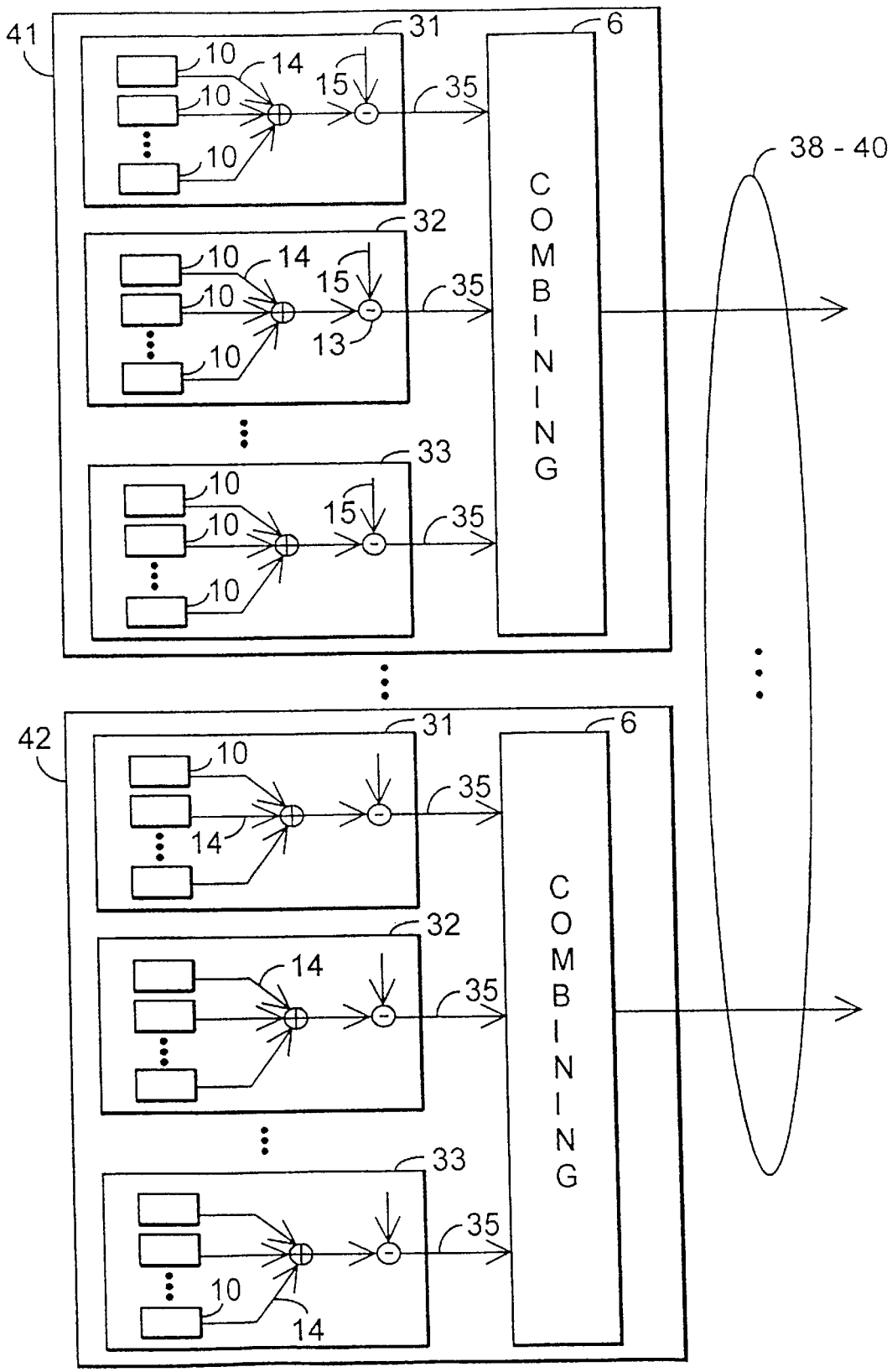
FIG. 7 shows a parallel interference cancellation.

The solution of the invention can also be implemented in parallel as shown in FIG. 7. In this figure the real part Q and the imaginary part I of the QPSK modulation are not shown separately but the signals are to be assumed to be complex. Means 41 and 42 generate a user-specific interference-free signal; the number of the means needed must equal the number of the users, i.e., K. The means 41 and 42 comprise interference cancellation units 31–33 and the combining means 6. In this solution there are a lot of interference cancellation primitives 10: (K*L) * (K*L−1) where K is the number of users and L is the number of paths of each user. Each user k has preferably an L number of interference cancellation units 31–33 which provide an interference cleaned signal 35 from each path I. The interference cleaned signals of the paths L of each user k are combined with the combining means 6. This solution is, as the adaptive solution in FIG. 6, a very fast interference cancellation method and the interference-free signals of all users are ready at the same time.

Figure 8:
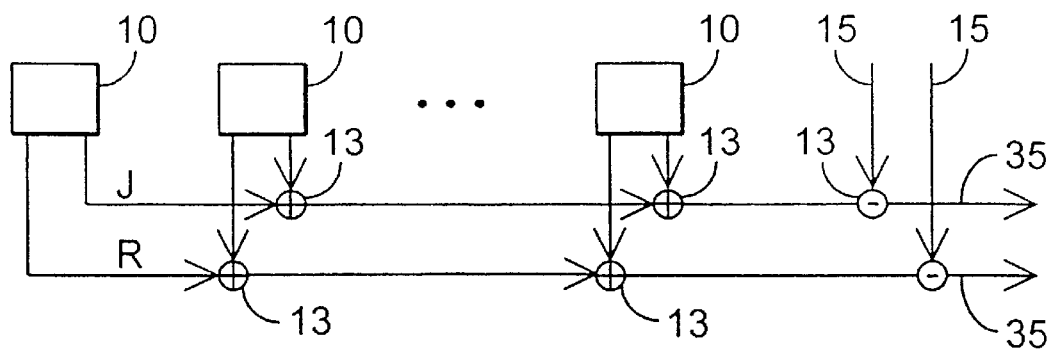
FIG. 8 shows a serial interference cancellation iteration.

In FIG. 8 interference cancellation is performed in serial mode. In this solution the interfering estimate signals of each interference cancellation primitive 10 are summed consecutively in a summer 13 and subtracted from the narrowband composite signal in the last summer 13. This FIG. 8 shows the complex operation of the I/Q modulation separately for the real part 12 and the imaginary part I. Each interference cancellation primitive 10 generates an interfering signal estimate of one path I. In this solution the interference cleaned signals of each user k and each path I are generated consecutively. In order to be able to clean the desired paths of all users each interference cancellation primitive 10 should be used K*L times. This solution preferably enables the use of already interference removed bit decisions in the interference cancellation of the next path.

Figure 9:
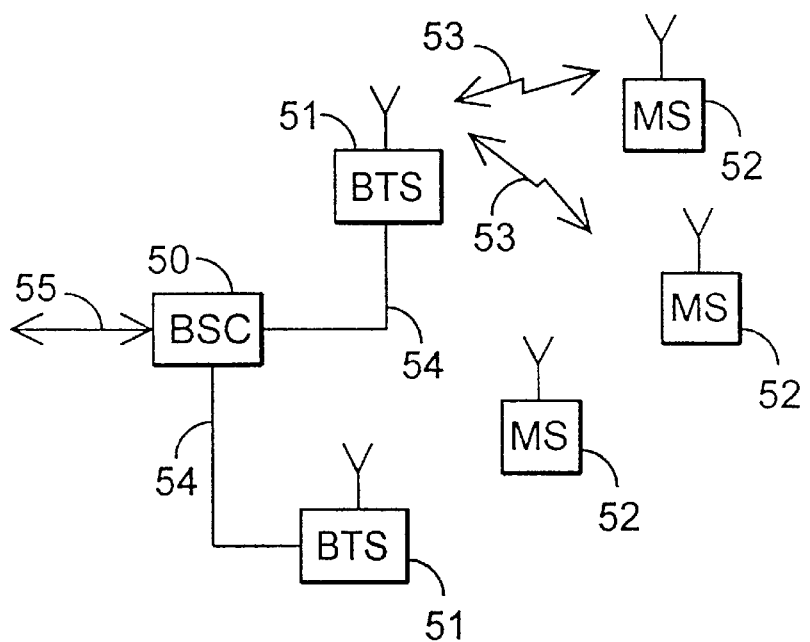
FIG. 9 shows a radio system.

FIG. 9 shows a radio system to which the solution of the invention can preferably be applied. The radio system comprises a base station controller 50, base stations 51, and subscriber terminals 52. The base station controller 50 communicates through a digital link 55 with the other parts of the system, for example, with a mobile services switching center (not shown in FIG. 9). The base stations 51 communicate through a digital link 54 with the base station controller 50. The subscriber terminals 52, which are preferably mobile phones, and the base stations 51 comprise a transmitter and a receiver to transmit and receive wideband signals 53 propagating on a plurality of paths and which are desired signals that also cause interference to one another. From a receiver point of view, the user is the transmitter, whereby the signals of several users are the signals of several transmitters. Thus, the composite signal 9 received by the receiver comprises a set of wideband signals 53 transmitted by individual transmitters. The radio system of the invention preferably uses DS-CDMA signalling in the signals 53, and one speed can be used as a data transmission speed or the data transmission speed can be varied. The solution of the invention is particularly suited to be used at the base station of the radio system.

The solutions of the invention can be implemented particularly regarding digital signal processing, for example, by ASIC or VLSI circuits. Functions to be performed are preferably implemented as software.

Even though the invention has been described with reference to the example of the accompanying drawings, it is obvious that the invention is not restricted to it but can be modified in various ways within the scope of the inventive idea disclosed in the attached claims.

I claim:

1. A receiving method used in a CDMA radio system including, as a transmitter and a receiver, at least one subscriber terminal and a base station, which receive a composite signal that has been multiplied by a spreading code into wideband, the composite signal arriving at the receiver over several paths from a plurality of transmitters, the composite signal then representing both interfering signals and desired signals, the method comprising:

converting the wideband composite signal into a narrowband composite signal at the receiver; and subtracting a narrowband interfering signal estimate of one path of at least one transmitter from the narrowband composite signal propagated over several paths to generate an interference removed signal.

2. The method of claim 1, further comprising:

multiplying a received interfering signal of at least one path of at least one transmitter by a cross correlation of spreading codes used in the interfering signal and the desired signal, whereby an estimate result weighted by the interference size is formed; and multiplying the weighted estimate result by a channel estimate, whereby the narrowband interfering signal estimate is generated.

3. The method of claim 1, wherein, when the composite signal includes symbols and when the desired signal and the interfering signal are in phase shift regarding each other, the interfering signal estimate representing more than one interfering signal symbol is subtracted from the narrowband composite signal to the extent that the interfering signal symbols interfere with one symbol of the desired signal, is subtracted from the narrowband composite signal.

4. The method of claim 1, wherein, when a total number of paths included in the method is predetermined and when strengths of the signals of different paths forming the received composite signal propagated over several paths is measured, the method further comprises subtracting a predetermined number of interfering signal estimates of the strongest paths from the narrowband composite signal.

5. The method of claim 1, wherein, when the signals of particular paths represent the signal of a particular transmitter, the interference removed signal of each path is generated by subtracting the interfering signal estimate separately from the narrowband composite signal and combining the interference removed signals of different paths thus generated into transmitter-specific signals.

6. The method of claim 1, further comprising subtracting the narrowband interfering signal estimate from the narrowband composite signal more than once in such a manner that new interfering signal estimates are generated using already interference removed signals and the new interfering signal estimates are removed from the narrowband composite signal.

7. The method of claim 1, wherein, when the composite signal includes symbols, the interfering signal estimate of one path is generated from the received narrowband signal one symbol at a time and is subtracted from the narrowband composite signal one symbol at a time.

8. The method of claim 1, wherein the interference removed signal of one path is generated by subtracting the narrowband interfering signal estimates of interfering paths from the narrowband composite signal.

9. The method of claim 8, further comprising generating interference removed signals of several paths successively in a serial mode.

10. The method of claim 8, further comprising generating interference removed signals of several paths in parallel.

11. A receiver arranged to be used in a CDMA radio system including at least one subscriber terminal and a base station which are arranged to receive a wideband composite signal including signals propagated over several paths from a plurality of transmitters, and which wideband composite signal includes both interfering signals and desired signals, and which wideband composite signal the receiver is arranged to convert into a narrowband composite signal, the receiver comprising:

an interference cancellation means including a plurality of interference cancellation primitives which are arranged to generate at least one narrowband interfering estimate signal describing interference, the interference cancellation means being arranged to subtract a narrowband interfering estimate signal from the narrowband composite signal.

12. The receiver of claim 11, wherein, when the wideband composite signal includes symbols, one interference cancellation primitive is arranged to generate the narrowband interfering signal estimate of one path of one receiver in such a manner that the interference cancellation primitive is arranged:

to choose two consecutive symbols from a five symbol window of an interfering signal; and to generate the interference estimate signal as a product of the consecutive symbols of the interfering signal based on a channel estimate of the interfering signal, based on a cross correlation of the interfering signal and the desired signal and based on the two consecutive symbols of the interfering signal so that a common effect of the two symbols on one symbol of the desired signal is taken into account in the product by summing the product of both of the two symbols and the cross correlation corresponding to the two symbols or a common product of both of the two symbols, the cross correlation of the interfering signal and the desired signal and the channel estimate of the interfering signal.

13. The receiver of claim 11, wherein the receiver is arranged to measure strengths of interfering signals, there is a predetermined number of interference cancellation primitives, the receiver is arranged to choose a predetermined number of the strongest interfering signal estimates to be removed from the narrowband composite signal; and the receiver is arranged to combine interference canceled signals of interference cancelled paths transmitter-specifically.

14. The receiver of claim 11, further comprising an interference cancellation means arranged to subtract interfering signal estimates from the narrowband composite signal at least twice successively to generate new interfering signal estimates using interference cleaned signals, the new interfering signal estimates being removed from the narrowband composite signal.

15. The receiver of claim 11, wherein the interference cancellation means is arranged to generate an interference cancelled signal of one path by subtracting narrowband interfering signal estimates of interfering paths from the narrowband composite signal.

16. The receiver of claim 15, wherein the interference cancellation means is arranged to generate interference cancelled signals successively in a serial mode.

17. The receiver of claim 15, wherein the interference cancellation means is arranged to generate interference cancelled signals substantially in parallel.

18. A receiving method used in a radio system including, as a transmitter and a receiver, at least one subscriber terminal and a base station, which receive a wideband composite signal, the wideband composite signal arriving at the receiver over several paths from a plurality of transmitters, the composite signal then representing both interfering signals and desired signals, the method comprising:

converting the wideband composite signal into a narrowband composite signal at the receiver; and subtracting a narrowband interfering signal estimate of one path of at least one transmitter from the narrowband composite signal propagated over several paths to generate an interference removed signal.

19. A receiver arranged to be used in a radio system including at least one subscriber terminal and a base station which are arranged to receive a wideband composite signal including signals propagated over several paths from a plurality of transmitters, and which wideband composite signal includes both interfering signals and desired signals, and which wideband composite signal the receiver is arranged to convert into a narrowband composite signal, the receiver comprising:

an interference cancellation means including a plurality of interference cancellation primitives which are arranged to generate at least one narrowband interfering estimate signal describing interference, the interference cancellation means being arranged to subtract a narrowband interfering estimate signal from the narrowband composite signal.

\* \* \* \* \*